United States Patent [19]

Petera

[11] 4,185,609

[45] Jan. 29, 1980

[54] BAND TYPE LAPIDARY SAW

[76] Inventor: Frank Petera, P.O. Box 695, Sundance, Wyo. 82729

[21] Appl. No.: 918,676

[22] Filed: Jun. 23, 1978

[51] Int. Cl.² ............................................. B28D 1/08
[52] U.S. Cl. .................................. 125/21; 51/135 BT; 51/263
[58] Field of Search ...................... 125/21, 18; 51/263, 51/135 BT

[56] References Cited

U.S. PATENT DOCUMENTS

| 511,715 | 12/1893 | Woodbury | 125/21 |
|---|---|---|---|
| 657,155 | 9/1900 | Bickford | 125/18 |
| 1,137,731 | 5/1915 | Ahern | 125/21 |
| 2,369,068 | 2/1945 | Mentzer | 125/21 |
| 2,624,158 | 1/1953 | Hendrickson | 51/135 BT |
| 3,028,711 | 4/1962 | Cambell | 51/263 |
| 3,434,362 | 3/1969 | Grage | 125/21 |
| 3,478,732 | 11/1969 | Clark | 125/21 |
| 3,525,324 | 8/1970 | Bonnefoy | 125/21 |

Primary Examiner—Harold D. Whitehead
Attorney, Agent, or Firm—Jack M. Wiseman

[57] ABSTRACT

A band type stone saw comprising a toothless blade having its cutting reach inclined and ascending toward the workpiece and wetted with continuously agitated liquid and abrasive slurry so that the slurry advances to the cutting edge of the blade and the blade carries the slurry upward into the developing saw kerf.

5 Claims, 3 Drawing Figures

BAND TYPE LAPIDARY SAW

BACKGROUND OF THE INVENTION

The present invention relates in general to stone cutting saws, and more particularly to the types of saws used in lapidary work for initially cutting a stone into slabs.

Prior art saws of this general nature may be broadly classified as circular type saws and band type saws. Band type saws usually employ an endless and highly tensioned multi-strand wire trained around drive and idler sheaves, and means for applying a liquid and abrasive slurry to the cutting reach of the wire. One of the drawbacks of such cutting wires is that they are relatively expensive. The relatively high expense for such cutting wires is related to their multi-strand and endless construction. This type of construction requires splicing, since it is not practical to use a rigid coupling. Another problem is that of continuously providing and delivering a thoroughly mixed cutting slurry to the cutting reach of the cutting wire, and collecting and returning the slurry to the cutting reach.

The patent to Lansing No. 2,150,381 discloses an endless cutting wire having a horizontal cutting reach which descends vertically through the developing saw kerf and is supplied with a cutting slurry of water and sand delivered by gravity from a slurry tank. The cutting wire construction is not disclosed, nor is there any provision for returning the slurry to the slurry tank.

The U.S. Pat. to Dessureau et al., No. 2,866,448 provides a vertical cutting wire reach which passes downward through a conical cup supplied with abrasive slurry, through the stone being cut, and through a second conical cup which apparently wipes the slurry from the wire to prevent it from interfering with the operation of the sheaves on which is mounted the endless cutting wire. No slurry agitation or recollecting means is disclosed, the thrust of the disclosure being to articulated mounting means which allow the cutting wire to trace any desired profile cut.

Wayland et al., U.S. Pat. No. 2,994,314 discloses a wire-type stone sawing machine having a vertically descending horizontal cutting reach gravitationally supplied with cutting slurry via a nozzle fed from an overhead separation chamber. The separation chamber is associated with somewhat complex means for collecting and recirculating the slurry plus additional fresh water and abrasive particles, and separates the stone particles from the slurry mixture.

Dioguardi, U.S. Pat. No. 3,220,149 discloses a metal cutting machine employing a high tension cutting wire, and which machine includes slurry collecting and recirculating means.

Other patents of interest are:
U.S. Pat. No. 3,311,415
U.S. Pat. No. 3,098,475
U.S. Pat. No. 1,620,021
U.S. Pat. No. 3,028,711
U.S. Pat. No. 3,299,877

SUMMARY OF THE INVENTION

A stone saw which employs an upper and a lower sheave carrying an endless metallic flat cutting blade or band. The flat side of the ascending cutting reach lies in a vertical plane and the cutting edge of the cutting reach is inclined toward the workpiece. For supplying an abrasive cutting slurry to the cutting blade, the lower sheave lies within an open top slurry tank and adjacent a driven paddle wheel which agitates and splashes a liquid and abrasive-particle cutting slurry onto the ascending cutting reach of the cutting blade. The inclination of the cutting reach enables slurry to be deposited into the developing kerf in the workpiece. A substantial part of the slurry is recirculated for return to the slurry tank.

The present invention achieves the following beneficial results:

1. The cutting blade cost is drastically reduced over the wire type blade and produces a narrow kerf.
2. Only one drive motor and two sheaves are required.
3. The slurry is constantly agitated and delivered to the cutting blade.

DESCRIPTION OF THE PREFERRED EMBODIMENT

Figure 1:
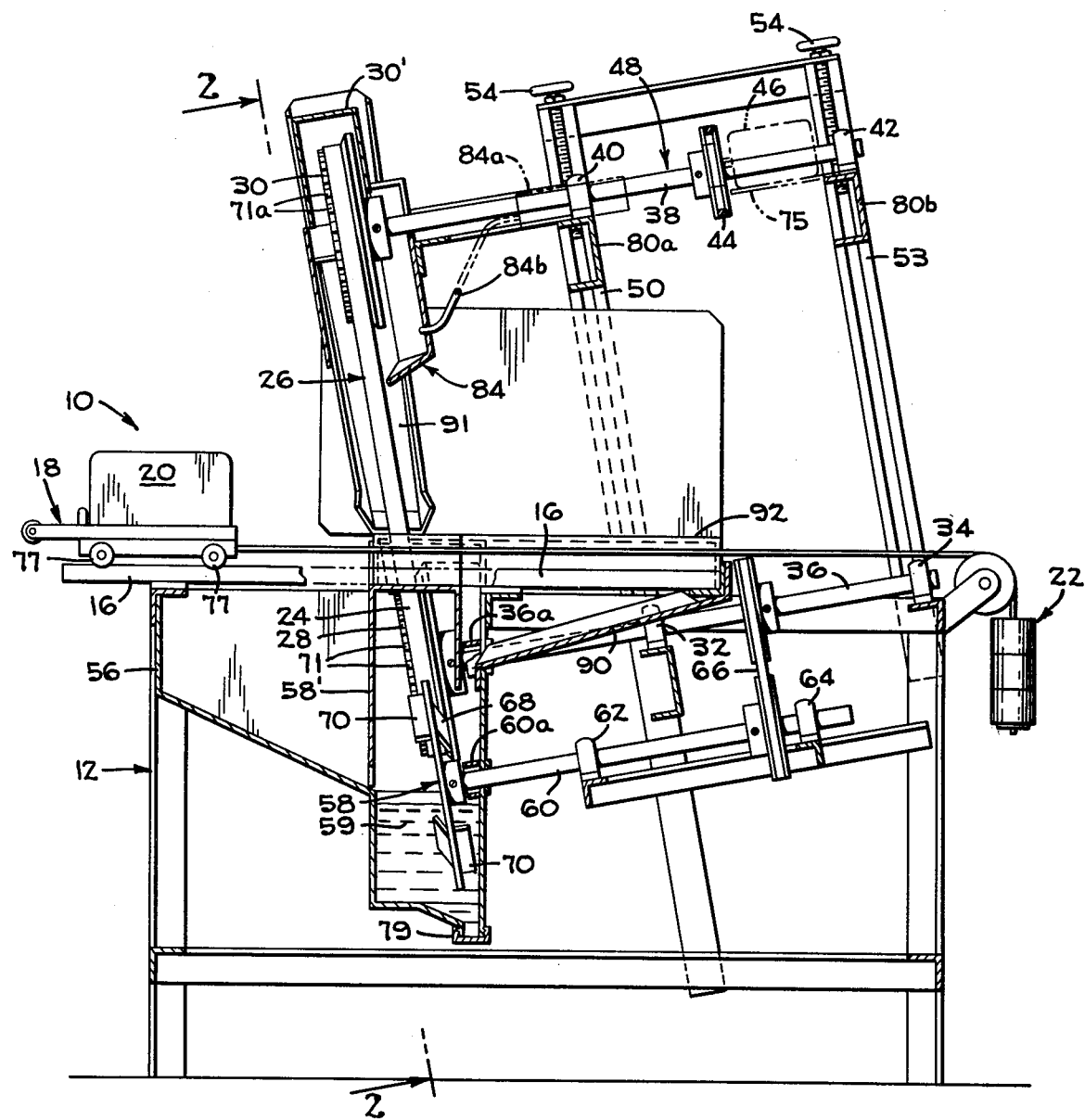
FIG. 1 is a diagrammatic vertical longitudinal section view through the stone saw of the present invention.
Figure 2:
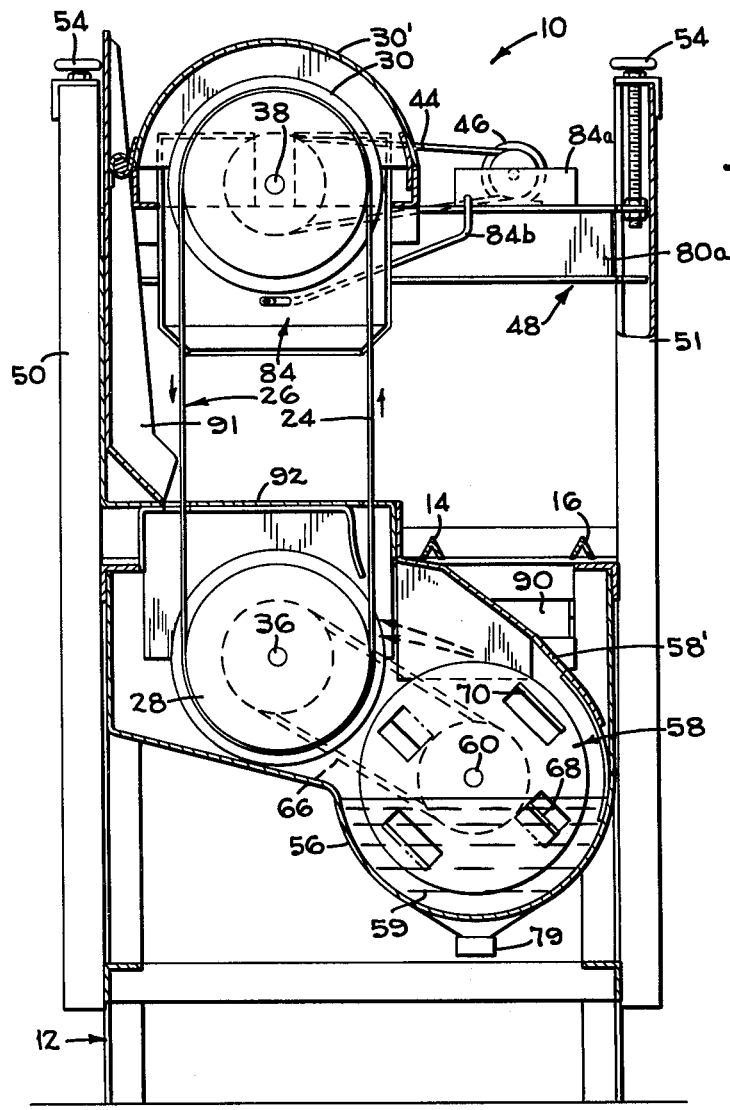
FIG. 2 is a diagrammatic vertical transverse section view taken along lines 2—2 on FIG. 1.

With reference to FIGS. 1 and 2, the stone saw 10 of the present invention includes a floor-mounted fabrication framework 12 which supports laterally spaced carriage rails 14 and 16. A roller carriage 18 is guided by the rails and includes suitable vises for securely mounting and carrying a workpiece (stone) 20 toward the right-hand end of the rails and viewed in FIG. 1. In the exemplary embodiment, the carriage 18 is supported by four wheels 77 with ball bearings on each side thereof. The wheels 77 are formed with V-grooves for riding on the rails 14 and 16. As is known in the art, the carriage may be so moved by a variable weight 22 which is connected to the carriage by a wire and pulley arrangement 23. It will be understood that the carriage 18 includes means (not shown) for laterally adjusting the position of the workpiece 20 in order to remove a desired thickness of slab from the workpiece as it is carried past a cutting reach 24 (FIG. 2) of an endless metallic cutting blade 26, and in order to repeat the operation with successive cuts of stone slab from the workpiece.

The cutting blade 26 is trained around a lower sheave 28, and around a vertically aligned upper sheave 30. For later described reasons, the general plane of the sheaves 28 and 30 is inclined so that the cutting reach 24 inclines forward relative to the advancing workpiece 20 in front of the reach 24.

Mounting means for the lower sheave 28 includes fixed bearings 32 and 34 which support an idler shaft 36. Similarly, the upper sheave 30 is carried by a driven shaft 38, operating in bearings 40 and 42, which is connected by a pulley and belt drive connection 44 to a motor 46. The shafts 36 and 38 should be sufficiently heavy to keep them from springing back when tension is placed on the cutting blade 26. The driven shaft 38, the motor 46 and associated components are carried by a rigid generally rectangular frame 48 which is elevationally adjustable to tension the cutting blade 26, and to align the sheave 30 relative to the lower sheave 28 for proper tracking of the cutting blade. To adjust the elevation of the frame 48, the latter is apertured at each of its corner portions to slide upon generally upright support posts 50, 51, 52 and 53. At each of said corner portions, a threaded rod and handwheel 54 is axially fixed to the associated support post and is threaded into the frame 48. The handwheels 54 are individually turned to adjust the frame 48 in parallelism with the idler shaft 36. More particularly, the support posts 50-53 are similar channelshaped members. The cross members 80a and 80b of the frame 48 are notched at their ends so that they will be adaptable to slide up and down in the channel-shaped support posts 50-53. The cross members 80a and 80b of the frame 48 serve as crossbraces. The cross members 80a and 80b have nuts welded to the ends thereof so that the threaded rods of the hand wheels 54 screw into the cross-members 80a and 80b. The threaded rods of the hand wheels 54 enter the channel-shaped posts 50-53. The motor 46 is mounted on the frame 48 with a bracket 75 so that the belt tension will be uniform.

In order to apply an abrasive slurry to the cutting reach 24 of the cutting blade 26 (FIGS. 2 and 3), the lower sheave 28 is disposed within an open top slurry tank 56 and above a driven paddle wheel 58 which splashes a liquid and abrasive slurry mixture 59 onto the cutting reach. A slurry contains a grit, such as silicon carbide. Thus, the paddle wheel 58 is mounted on a shaft 60 rotatable in bearings 62 and 64, and having a pulley and belt drive connection 66 to the idler shaft 36. The shafts 36, 38 and 60 are at an incline to aid in keeping the slurry and the grit away from the bearings 32, 34, 40, 42, 62 and 64. The rear wall of the slurry tank 56 is formed with a suitable drain plug 79 in the bottom wall thereof. In the preferred embodiment, the plug 79 has an externally threaded outlet projecting downwardly therefrom and an internally threaded cap. In this manner, the threads will not be filled with the grit of the slurry during the draining procedure. The paddle wheel 58 should be sufficiently large in diameter and operate at a rate of rotation to cast the slurry onto the cutting reach 24. A shield 58' is disposed within the tank 56 above the paddle wheel 58 to inhibit the casting of slurry outside the tank 56. The placement of the paddle wheel 58 and the speed of rotation of the paddle wheel 58 also serve to inhibit the casting of slurry outside the tank 56. The shield 58' is attached to the tank 56 in a suitable manner, such as a pivot connection.

The tank 56 is configured so as to concentrate the slurry at the lower one-third portion of the paddle wheel 58. The openings through which the shafts 36 and 60 are received by the tank 56 should be of sufficient diameter so that the shafts 36 and 60 do not contact the surrounding walls of the openings formed by the tank 56. The collection of the grit of the slurry in such openings would tend to cause excessive wear on the shafts 36 and 60 should the shafts 36 and 60 contact the walls surrounding such openings.

A cylindrical cover 36a extends from an inner wall of the tank 56 and receives the portion of the shaft 36 in the tank 56. Similarly, a cylindrical cover 60a extends from an inner wall of the tank 56 and receives the portion of the shaft 60 in the tank 56. A cover, not shown, may be provided attached to the shield 30' to extend over the adjacent portion of the shaft 38.

Figure 3:
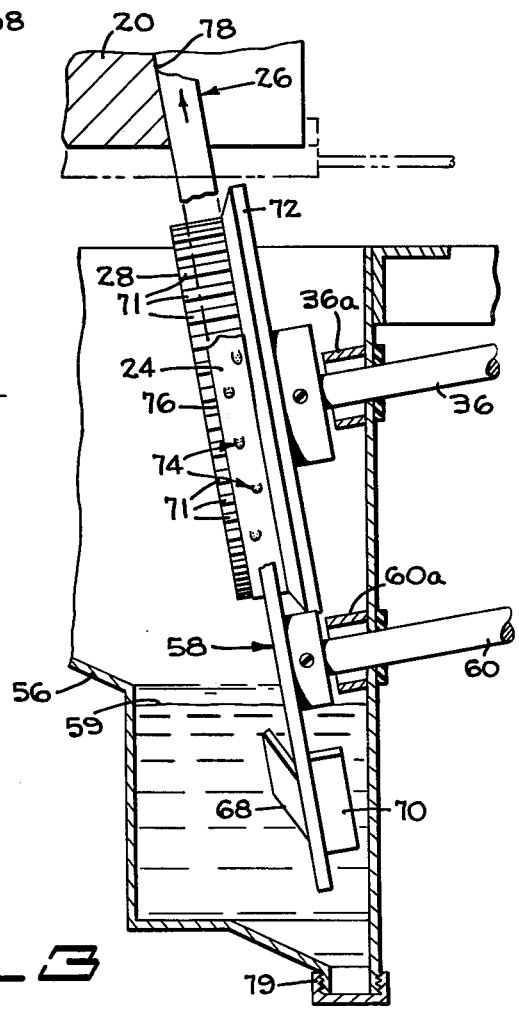
FIG. 3 is an enlarged fragmentary diagrammatic section illustrating operational features of the present invention.

As shown best in FIG. 3, the paddle wheel 58 preferably comprises radially disposed, oppositely directed fins or flat stirring vanes or blades 68, and generally concentrically disposed, oppositely directed fins or arcuate lifting vanes or blades 70 on opposite walls of the paddle wheel 58. The vanes 68 on each side of the paddle wheel 58 serve to move the slurry from side to side. The vanes 70 serve to lift or pick up the slurry in an upward motion. The paddle wheel 58 stirs the slurry in this manner, because it has been found that slurry may contain a silicon carbide grit, which has a relatively high specific gravity, and, hence, is relatively heavy. As such, the grit of the slurry tends to settle out rather rapidly.

In the preferred embodiment, the distance between the bottom of the slurry tank 56 and the adjacent portion of the paddle wheel 58 should be approximately one-half inch to constantly pick up all the grit of the slurry in the tank 56.

As indicated by the directional arrows on FIG. 2, the cutting reach 24 of the cutting blade 26 ascends, since the lower sheave rotates counterclockwise. Accordingly, the stirring blade paddle wheel 58 turns in the same direction and splashes the slurry upward onto said ascending cutting reach, while at the same time being partially submerged in the slurry mixture 59 and keeping it constantly mixed to maintain a uniform cutting action. A slurry deflector, not shown, is disposed behind the blade 26 to direct the slurry on each side of the blade 26. A shield 30' is disposed above the sheave 30 to inhibit the casting of slurry outside of the tank 56. The shield 30' is attached to the tank 56 by suitable means, such as a pivot connection. The construction of the supporing structure serves to inhibit the casting of slurry from the sheave 28 outside of the tank 56. A drip pan 84 is disposed on the cross members 80a and 80b to drip water into the slurry tank 56. A tube 84a supplies water to the drip pan 84 from a supply tank 84b containing water.

A feature of the present invention is to prevent slurry accumulation on the lower sheave 28 (FIG. 3). For this purpose, the peripheral blade-engaging surface thereof is formed of circumferentially spaced, elastomeric blocks 71 bonded thereto. The elastomeric blocks 71 are disposed axially inward of a radial flange 72 to restrict movement of the cutting blade 26 and to resist edgewise thrust upon the cutting blade 26 when the workpiece is being cut. It has been found that the elastomeric blocks 71 prevent the slurry from building up on the sheave 28. The accumulation of slurry on the sheave 28 will tend to impede proper tracking by the blade 26.

In a similar manner, the upper sheave 30 includes elastomeric blocks 71a, which are similar in construction and operation to the elastomeric blocks 71 for the lower sheave 28. The elastomeric blocks 71a prevent slurry accumulation on the upper sheave 30. Toward this end, the peripheral blade-engaging surface of the sheave 30 is formed with the circumferentially spaced, elastomeric blocks 71a bonded thereto. The elastomeric blocks 71a are disposed axially inward of the radial flange of the sheave 30 to restrict movement of the cutting blade 26 and to resist edgewise thrust upon the cutting blade 26 when the workpiece is being cut. The elastomeric blocks 71a tend to prevent the accumulation of slurry on the sheave 30. The accumulation of slurry on the sheave 30 will tend to impede proper tracking by the blade 26.

Another feature of the present invention is that the cutting blade 26 may be constructed without cutting teeth and may be formed of ordinary metallic package bonding material which is brazed into an endless loop. In the exemplary embodiment, the metal package strapping material is from 0.015 to 0.020 of an inch thick. Since the blade material is inexpensive or can be readily salvaged, the cutting blade cost is rather nominal. Another feature of the present invention is that the constantly agitated cutting slurry is automatically and continuously splashed onto the cutting reach 24 (FIG. 3), after which the inclination of said reach causes gravitational flow of the slurry (at 74) to the cutting edge 76. Further, this structural arrangement causes the slurry to be continuously delivered into the developing saw kerf at 78, and gravity effects a certain degree of immediate slurry recollecting by the slurry tank 56. It is also to be noted that only two sheaves are required for the cutting blade and that no auxiliary pumps or motors are necessary to distribute and mix the cutting slurry. Additionally, the stone saw 10 is of notable simplicity despite the fact that it may be dimensioned for large volume workpieces.

A drain pan 90 is attached to the framework 12 to be disposed below the carriage rails 14 and 16 to collect slurry dripping from the carriage 18. The drain pan 70 will serve to return to the tank 56 the slurry dripping from the carriage 18.

A slurry deflector 91 is disposed in confronting relation to the saw blade 26 and is attached to a table 92 that is mounted on framework 12.

I claim:

1. A lapidary saw for slabbing rocks comprising:
   (a) a rigid frame;
   (b) upper and lower sheaves mounted for rotation on said frame and disposed in an inclined plane;
   (c) an endless band saw blade trained around said sheaves, the ascending reach of said blade being the cutting reach and being inclined toward the workpiece to be cut;
   (d) a slurry tank disposed below said lower sheave; and
   (e) a driven paddle wheel mounted beneath said lower sheave and having its lower sector disposed within the contents of said slurry tank for agitating the slurry to maintain a suspension state and for casting slurry onto the ascending reach of said blade.

2. A lapidary saw for slabbing rocks as claimed in claim 1 and including means for adjustably positioning the height of said upper sheave for regulating the tension on said blade.

3. A lapidary saw for slabbing rocks as claimed in claim 1 and including means for aligning said upper sheave relative to said lower sheave for regulating the angle of inclination of the cutting reach of said blade.

4. A stone cutting saw comprising:
   (a) a frame;
   (b) an endless band saw blade with a cutting reach;
   (c) means supporting said band saw blade on said frame with the cutting reach of said band saw blade ascending and being inclined toward a workpiece and driving said endless band saw blade to produce a kerf in the workpiece;
   (d) means for providing relative feeding motion between said cutting reach of said band saw blade and the workpiece; and
   (e) means for supplying a liquid and abrasive slurry onto said ascending cutting reach of said band saw blade, the slurry thereupon advancing onto the cutting edge of said inclined cutting reach, said cutting reach depositing slurry into the kerf produced in the workpiece,
   (f) said means for supporting and driving said endless band saw blade including a sheave supporting the lower bight of said band saw blade, said sheave having a notched peripheral blade engaging surface with circumferentially spaced and axially disposed spaces to provide drainage paths for the slurry, said notched blade engaging surface comprising circumferentially spaced elastomeric blocks secured to said sheave to form said circumferentially spaced and axially disposed spaces,
   (g) said means for supplying a liquid and abrasive slurry being disposed below said sheave, said stone cutting saw further comprising a driven paddle wheel mounted beneath said sheave and having its lower sector disposed within the slurry for agitating the slurry to maintain a suspension state and for casting slurry onto the ascending reach of said band saw blade.

5. A stone cutting saw comprising:
   (a) a rigid frame;
   (b) upper and lower sheaves mounted for rotation on said frame;
   (c) an endless band saw blade trained around said sheaves, to be driven thereby, said endless band saw blade having a cutting reach for cutting a workpiece;
   (d) a slurry tank mounted on said frame and disposed below said lower sheave;
   (e) a paddle wheel mounted on said frame beneath said lower sheave and having its lower sector disposed within the contents of said slurry tank; and
   (f) means for driving said paddle wheel for agitating the slurry in said slurry tank to maintain a suspension state and for casting slurry onto the cutting reach of said band saw blade.

* * * * *